Dec. 26, 1961     H. N. OSBORNE     3,014,252
SUN SCREENS AND THE LIKE
Filed July 10, 1959
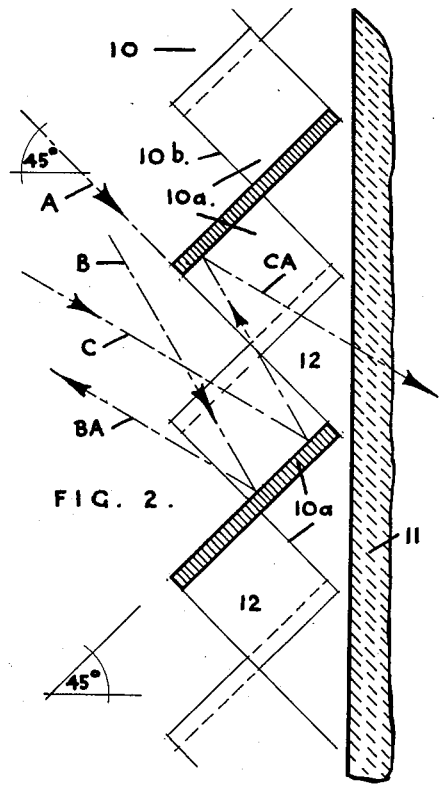
FIG. 2.
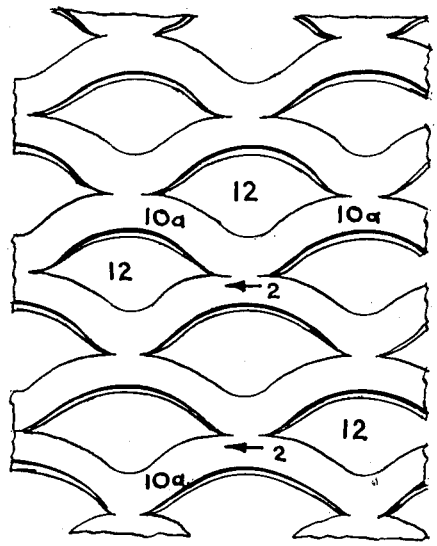
FIG. 1.
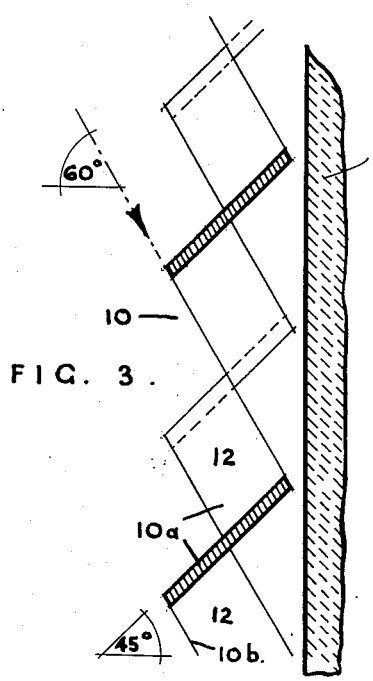
FIG. 3.
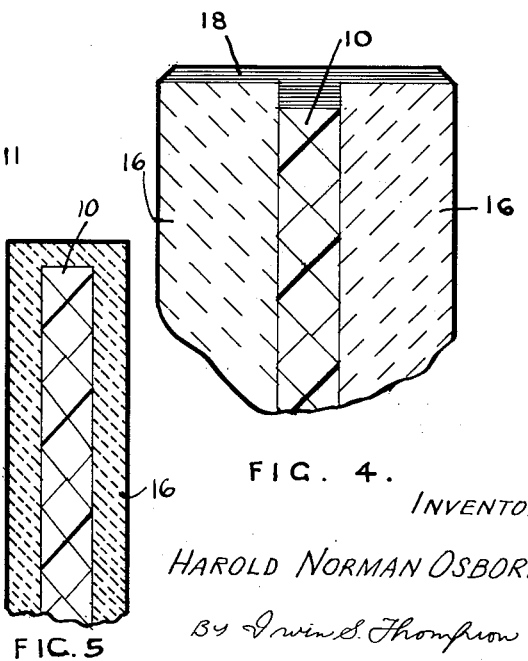
FIG. 4.
FIG. 5
INVENTOR
HAROLD NORMAN OSBORNE
By Irwin S. Thompson
ATTY.

3,014,252
SUN SCREENS AND THE LIKE
Harold Norman Osborne, 225 Springvale Road,
Glen Waverley, Victoria, Australia
Filed July 10, 1959, Ser. No. 826,169
4 Claims. (Cl. 20—56.5)

This invention relates to screens and especially to sun screens for shielding windows, glass walls and the like of buildings and vehicles from excessive light and heat from the sun.

The problem of suitably controlling the heat intake through windows and glass walls exposed to direct solar radiation is common to most buildings in climates where the summer temperatures are high, but is experienced in its most acute form in buildings with sheer glass curtain walls, particularly those with easterly and westerly aspects. In other types of buildings, a useful and perhaps adequate degree of sun control is obtainable by means of projecting shading elements arranged horizontally and/or vertically above and at the sides respectively of the windows, but this remedy is generally not available in the case of glass curtain walls and other large glass areas owing to constructional difficulties and aesthetic considerations.

Consequently buildings of this type usually require excessively large and expensive air conditioning plants to maintain suitable internal temperature conditions during the summer season.

In order to reduce the solar heat intake, it is well known to use special glass having a relatively low conductivity for radiant heat, but such glass necessarily absorbs and reradiates heat so that although it usefully reduces the heat load, its efficiency is limited, while in addition, it is comparatively expensive.

Experience has shown that the most effective method of reducing the heat load through glass is to intercept and reject the radiant heat before it passes through the glass such as by external shading devices which may be either reflectors or absorbers, because an external heat absorber dissipates the major part of its heat gain by external re-radiation and conduction.

However, any external shading device should conform to the architectural style of the building, and thus in the case of modern buildings having clean sheer lines of glass curtain wall construction is preferably in the form of a substantially flat screen which covers the glass.

Such a screen should be so constructed as to reject a sufficient proportion of the heat load in summer, while permitting the entry of as much direct solar light and radiant heat as possible in winter, and also permitting the entry at all seasons of diffuse indirect light from the lower zone of the sky vault. In order to satisfy these requirements, it is necessary that a screen be designed with regard to the latitude of the building and the aspect of the window, wall or the like concerned.

It is also necessary in most cases that such a screen should not unduly impair vision through the glass and it should be aesthetically pleasing.

The present invention includes a sun or like screen comprising forwardly and downwardly inclined elements defining therebetween a multiplicity of closely spaced openings surmounted by individual hoods and distributed over the area thereof, and wherein the dimensions of the openings are so related to the width and inclination of the said elements as to cut off direct rays from a source above a predetermined altitude angle.

More particularly, the said screen preferably has the form of a generally flat sheet and comprises a plurality of connected transversely extending strands which are of zig-zag, sinuous or other like form when viewed from the front, and which have their upper surfaces inclined downwardly and outwardly at a uniform angle when viewed from the side, the said strands being arranged in echelon with the upper portion of each strand arranged in front of the lower portion of the strand immediately thereabove, thereby to define between the several strands a multiplicity of openings disposed in staggered relationship.

Due to the form of the screen, the said openings are shaded from the sides as well as from the top in contrast to a screen composed of transversely inclined horizontal louvres which permit a considerable proportion of oblique rays to pass through the louvre openings by double reflection.

The said openings may be large or small and in either case, the width of the said strands conforms thereto, but preferably the said openings are small and closely spaced so as not to interfere unduly with vision through the glass covered thereby.

The said screen may be arranged externally of and close to a window or glass wall, or it may be used alone to cover an opening and in either case it may be utilised primarily as a heat absorber or primarily as a reflector. In the former case, the screen preferably has a black matt finish. Preferably however the screen is utilised to reflect light and radiant heat and for this purpose it is provided with a suitably reflective surface which may be of any desired colour and reflection/absorption properties.

In lieu of arranging the screen externally of the window or the like, the said screen may be incorporated therein. Thus the window or the like may comprise inner and outer sheets with the screen arranged therebetween, in which case, the edges of the assembly are preferably suitably sealed to prevent the entry of dust and moisture to the intervening space.

Alternatively, the screen may be embedded in the glass during the manufacture of the sheet thereof in the manner which is already known for the production of glass sheets reinforced with wire mesh.

A composite sheet enclosing a reflective screen as herein described is very attractive in appearance and is thus suitable for interior decorative use, and the invention is thus not confined to sun screens.

Sun screens as hereinbefore described may also be used in the form of fixed or angularly adjustable louvres, either alone or in conjunction with glass louvres, in which case they may be arranged either in front of or incorporated in the glass.

A screen according to the invention may be formed of expanded sheet metal or other similar material, but for optimum results it is necessary that the strand width and inclination and the width of the openings satisfy the shading requirements having regard to the latitude and aspect for which the screen is required. The strand angles and the dimensions of the openings of expanded metal as at present produced are generally not uniform and such variations which are unimportant for the purposes for which such material has previously been used, detract from their efficiency for the purpose of the present invention. The desired uniform strand angles and spacings may however be produced by suitable tools.

A screen according to the invention may however be formed of any suitable material and in any convenient manner, and it may for example, be moulded from plastic material. The screens moreover are not restricted to use on vertical windows or walls, as they may also be used for example on roofs.

An external sun screen according to the invention may serve additionally as an insect screen and/or as a protective screen or window guard. In the case of an insect screen, the aforesaid openings therein are necessarily very small, while in the case of a protective screen, the screen is preferably of heavier construction, in which case, the openings may be comparatively large.

The invention further includes the method of controlling the radiant heat load of a building, comprising intercepting and reflecting radiant energy by means of wall and/or window screens of the aforesaid kind having cut-off angles conforming to the latitude and the aspects of the walls as hereinafter further described.

The invention is hereinafter described with reference to the accompanying drawings, in which:

FIGURE 1 is a view in front elevation to an enlarged scale of a small portion of an expanded metal sun screen according to the invention, FIGURE 2 is a view in vertical section taken on the line 2—2 of FIGURE 1 and is drawn to a still larger scale, FIGURE 3 is a view similar to FIGURE 2 and shows a screen so formed as to have different shading and reflecting properties, FIGURE 4 is a view in vertical section of a screen according to the invention arranged between two sheets of glass, and FIGURE 5 is a view in vertical section of a screen according to the invention embedded in the glass.

FIGURES 1 and 2 show a sun screen 10 according to the invention, and though it may have any suitable dimensions provided that the requisite geometrical relationships are maintained, it is preferred for most purposes to use screens of considerably smaller dimensions than those shown. Thus for example the openings may be about one-eighth of an inch in length and about one-sixteenth of an inch in width, though they may be either larger or smaller according to requirements.

The screen is shown arranged in front of a window or glass panel 11, and for this purpose, it is preferably secured in a taut condition to a frame or surround (not shown) which may be fixed in any convenient manner to the building wall or which alternatively may be slidably mounted in guides or hingedly supported to permit of regulation of the screening effect.

The illustrated screen is formed of expanded sheet metal or other suitable material having suitable reflecting properties, e.g. aluminium sheet, and comprises horizontal rows of spaced laterally elongated openings 12 which are approximately of diamond shape when viewed from the front. The openings in alternate rows are arranged in vertical alignment, while those in the intervening rows are disposed midway between those in the first-mentioned rows.

The said openings are defined by integrally connected inclined strands 10a produced by forming spaced horizontal slits in the originally plain flat sheet and by then stretching the latter at right angles to the said slits in the known manner. During the stretching operation, each initially horizontal strip or strand defined by and lying between two adjacent rows of slits, is deformed into an approximately zig-zag shape and is tilted relatively to the plane of the sheet substantially as shown in FIGURE 2, though for the present purpose, the strands are preferably set accurately at the required inclination and curvature by suitable dies so that the angle of inclination is substantially uniform throughout the length of each strand.

Thus, each horizontal row of openings is formed between two adjacent strands 10a which are of opposed zig-zag or sinuous shape when viewed from the front and the upper surface of which incline forwardly and downwardly when viewed from the side, the strands being thus tilted and arranged in echelon so that the upper crests of the lower strand are arranged in front of and are integrally united to the lower crests of the upper strand.

The upper half of each opening is thus defined by a forwardly and downwardly inclined shading and reflecting hood which intercepts radiation from either side as well as from the front when the sun reaches a predetermined altitude.

In the screen shown in FIGURE 2, the strands 10a incline downwardly and forwardly at an angle of 45° to the horizontal plane and the front edges 10b thereof incline downwardly and inwardly at an angle of 45° to the horizontal plane. Thus, when the altitude of the sun is 45° or more, all direct rays are intercepted and reflected, while at altitudes of less than 45°, some direct rays pass directly through the openings 12, others pass inwardly by double reflection, while others again are reflected outwardly.

For example, the line A denotes an incident ray having an angle of 45° which is the cut-off angle of the screen and as this ray is normal to the strands 10a, it is reflected in the same path. Similarly the line B designates an incident ray at an angle of 60° to the horizontal plane and is reflected at an angle of 30° as shown by the line BA. Again the line C shows an incident ray with an angle of 30° to the horizontal which impinges on the inner part of a strand 10a so that it is reflected upwardly onto the underside of the strand at the top of the respective opening 12 and is reflected therefrom into the room as shown by the arrow CA. However, if the ray C were to impinge on a forward portion of a strand, it would be reflected externally.

As shown in the drawings, the aforesaid crest portion of each hood occupies only a small proportion of the length of the opening, when the screen is viewed from the front so that each side of the hood slopes downwards from a position close to the vertical centerline through the opening and in consequence of this formation, a considerable proportion of the heat rays, which impinge on the hood at an oblique angle (when the screen is viewed in plan) is reflected outwardly so that it does not again strike the screen. Thus the openings are effectively shaded from the sides as well as from above, whereas, in the same circumstances, a horizontal louvre screen permits much more heat to pass therethrough by double reflection in the manner indicated by the ray C in FIGURE 2.

It is to be observed also that due to the zig-zag form of the strands, the rays, when viewed in plan, are reflected in different directions so that excessive external glare from the screen is avoided as contrasted with screens comprising parallel horizontal louvres.

Consequently, by suitably selecting the strand widths and strand angles and the width of the openings in the vertical direction of the screen, the latter may be adapted for any use in any required latitude and for any required aspect by the use of known solar diagrams showing the sun path in terms of azimuth and altitude through a selected day.

The screen may therefore be designed so as to reject by reflection a considerable proportion of direct light and heat rays from the sun during the hot summer months, while admitting an adequate amount of light and heat during the winter period. It will of course be apparent that a screen for a westerly aspect requires a smaller cut-off angle than one with a northerly aspect.

Moreover, the screen does not interfere unduly with vision through the window, though it necessarily does present some obstruction.

More particularly, the screens herein disclosed preferably differ from existing forms of expanded metal in that the strand width, spacing and inclination are such that the sun's direct radiation is cut-off and reflected to obtain optimum heat rejection between predetermined hours on a selected date, this cut-off angle being determined by—

(a) the orientation or aspect of the screen and the path of the sun of the selected date, and (b) the optimum conditions for admission of desirable winter sun partly by admitting radiation by double reflection at lower sun altitudes to provide an increasing amount of winter warmth up to mid-winter for maximum conditions of seasonal efficiency i.e. to provide the best economic conditions for the heating of buildings in winter and the reduction of the heat load in summer.

Strand width, strand spacing, and strand angle all have an important bearing on the amount of light admitted, and on vision through the screen, and thus are important design criteria for the purpose of the present invention.

FIGURE 3 shows by way of example, another screen with a cut-off angle of 60° and a strand angle of 45° produced for example by deforming the metal during the operation of forming the screen, and in general by using appropriate forming tools, any required cut-off and strand angles may be obtained to suit the design conditions. In general, the strand angle is preferably slightly greater than 90° minus the cut-off angle, so that incident rays having an angle equal to or greater than the cut-off angle are reflected outwardly.

FIGURE 4 shows a screen 10 according to the invention arranged between two sheets 16 of glass or other suitable transparent material to form a composite glazing panel suitable for use in windows or in the construction of curtain walls. Preferably the edges of the central cavity in which the screen is arranged are sealed as shown at 18 to prevent internal condensation and the entry of dust.

This form of the invention provides many advantages as among other things the screen is fully enclosed and protected so that it does not require cleaning, it presents an attractive appearance, and forms an effective shading device. Such a composite panel also provides the known advantages of reduced heat conductivity and sound insulation, and these properties may be improved by exhausting the central cavity and/or by arranging the screen out of contact with the sheets 16. The screen, when made of aluminum sheet, may be anodised to any desired colour and for this type of application, it is preferably formed from a sheet having a maximum thickness of about 0.005 to 0.01 of an inch.

Alternatively, FIGURE 5 shows the screen 10 may be embedded in the sheet of glass 16 or other material during the manufacture of the latter.

I claim:

1. A glazing unit comprising two vertically parallel spaced sheets of transparent material such as glass and a sun screen of sheet-like form interposed between and substantially parallel to said sheets and having a multiplicity of small openings of approximate diamond shape uniformly distributed thereover in staggered relationship, said screen comprising closely spaced reflective elements extending horizontally thereacross, each of the said elements having a form of a flat ribbon arranged at a vertical inclination of not less than about 40° to and from the planes of each sheet of transparent material and being bent in a regular sinuous shape such that relatively long and oppositely inclined portions thereof merge together in relatively short upper and lower crest portions, and each adjacent pair of reflective elements being staggered so that each of the spaced upper crest portions of a lower element registers with and forms a forward continuation of the respective lower crest portion of an upper reflective element, each of said openings, having its upper portion defined and surmounted by an individual side shading hood constituted by an inclined portion of the reflective element disposed immediately thereabove for shading sun rays from the side.

2. A glazing unit comprising two vertically parallel spaced sheets of transparent material such as glass and a sun screen of sheet-like form interposed between and substantially parallel to said sheets and having a multiplicity of closely spaced laterally elongated openings of approximate diamond shape and about 0.2 of an inch in length, said openings being uniformly distributed in staggered relationship, said screen comprising closely spaced reflective elements extending horizontally thereacross, each of said elements having a form of a flat ribbon arranged at a vertical inclination of not less than about 40° to and from the planes of each sheet of transparent material and being bent in a regular sinuous shape such that relatively long and oppositely inclined portions thereof merge together in relatively short upper and lower crest portions, and each adjacent pair of reflective elements being staggered so that each of the spaced upper crest portions of a lower element registers with and forms a forward continuation of a respective lower crest portion of an upper reflective element, each of the said openings having its upper portion defined and surmounted by an individual side shading hood constituted by an upwardly directed portion of the reflective element disposed immediately thereabove for shading sun rays from the side.

3. A glazing unit comprising a vertical sheet of transparent material such as glass and a sun screen of sheet-like form arranged substantially parallel to said sheet and therebehind and having formed therein a multiplicity of substantially diamond shape small openings which are uniformly distributed thereover in staggered relationship, said screen comprising closely spaced reflective elements extending horizontally thereacross, each of said elements having a form of a flat ribbon arranged at a vertical inclination of not less than about 40° to the plane of said sheet of transparent material and being bent in a regular sinuous shape such that relatively long and oppositely inclined portions thereof merge together in relatively short upper and lower crest portions, and each adjacent pair of reflective elements being staggered so that each of the spaced upper crest portions of a lower element registers with and forms a forward continuation of a respective lower crest portion of an upper reflective element, each of said openings having its upper portion defined and surmounted by an individual side shading hood constituted by the reflective element disposed immediately thereabove for shading sun rays from the side.

4. A glazing unit comprising a vertical sheet of transparent material such as glass and a sun screen of sheet-like form substantially parallel to said sheet and embedded therein, said screen having formed therein a multiplicity of substantially diamond shape small openings which are uniformly distributed thereover in staggered relationship, said screen comprising closely spaced reflective elements extending horizontally thereacross, each of said elements having a form of a flat ribbon arranged at a vertical inclination of not less than about 40° to the plane of said sheet of transparent material and being bent in a regular sinuous shape such that relatively long and oppositely inclined portions thereof merge together in relatively short upper and lower crest portions, and each adacent pair of reflective elements being staggered so that each of the spaced upper crest portions of a lower element registers with and forms a forward continuation of a respective lower crest portion of an upper reflective element, each of said openings having its upper portion defined and surmounted by an individual side shading hood constituted by an upwardly directed portion of the reflective element disposed immediately thereabove for shading sun rays from the side.

References Cited in the file of this patent

UNITED STATES PATENTS

| | | |
|---|---|---|
| 2,366,224 | Warp | Jan. 2, 1945 |
| 2,609,781 | Gruetjen | Sept. 9, 1952 |
| 2,745,150 | Warns | May 15, 1956 |